US010315938B2

(12) United States Patent
Li et al.

(10) Patent No.: US 10,315,938 B2
(45) Date of Patent: Jun. 11, 2019

(54) ACTIVATING AGENT FOR TREATMENT OF RADIOACTIVE WASTEWATER AND METHOD USING THE SAME FOR RADIOACTIVE WASTEWATER TREATMENT

(71) Applicant: TSINGHUA UNIVERSITY, Beijing (CN)

(72) Inventors: Fuzhi Li, Beijing (CN); Xuan Zhao, Beijing (CN); Meng Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 276 days.

(21) Appl. No.: 15/264,580

(22) Filed: Sep. 13, 2016

(65) Prior Publication Data

US 2017/0001891 A1 Jan. 5, 2017

Related U.S. Application Data

(63) Continuation-in-part of application No. PCT/CN2015/081900, filed on Jun. 19, 2015.

(30) Foreign Application Priority Data

May 26, 2015 (CN) .......................... 2015 1 0271705

(51) Int. Cl.

| | |
|---|---|
| ***B01D 61/52*** | (2006.01) |
| ***G21F 9/06*** | (2006.01) |
| ***G21F 9/20*** | (2006.01) |
| ***C02F 1/68*** | (2006.01) |
| ***C02F 1/469*** | (2006.01) |
| ***B01D 61/58*** | (2006.01) |
| *G21F 9/04* | (2006.01) |
| *C02F 101/00* | (2006.01) |
| *B01D 61/02* | (2006.01) |
| *B01D 61/42* | (2006.01) |
| *C02F 1/44* | (2006.01) |

(52) U.S. Cl.

CPC ................ *C02F 1/68* (2013.01); *B01D 61/52* (2013.01); *B01D 61/58* (2013.01); *C02F 1/4695* (2013.01); *G21F 9/06* (2013.01); *G21F 9/20* (2013.01); *B01D 61/025* (2013.01); *B01D 61/42* (2013.01); *B01D 2311/12* (2013.01); *C02F 1/441* (2013.01); *C02F 2101/006* (2013.01); *C02F 2209/10* (2013.01); *C02F 2305/00* (2013.01); *G21F 9/04* (2013.01)

(58) Field of Classification Search

CPC ....................... C02F 2101/006; B01D 2311/12

See application file for complete search history.

(56) References Cited

U.S. PATENT DOCUMENTS

2013/0022795 A1* 1/2013 Wang .................... D06P 1/5292 428/195.1

* cited by examiner

*Primary Examiner* — Salil Jain

(74) *Attorney, Agent, or Firm* — Matthias Scholl P.C.; Matthias Scholl

(57) ABSTRACT

An activating agent for the treatment of radioactive wastewater. The activating agent is prepared by dissolving a mixture of inorganic salts including $Ca^{2+}$, $Na^{+}$, $Sr^{2+}$, $Zn^{2+}$, $Mg^{2+}$, $Fe^{2+}$ and $K^{+}$ in pure water having an electrical resistivity greater than 0.5 MΩ·cm to yield a solution. A method of radioactive wastewater treatment using the activating agent includes: 1) preparing the activating agent; 2) adding the activating agent to radioactive wastewater having an electrical resistivity greater than 0.5 MΩ·cm; uniformly mixing the activating agent and the radioactive wastewater; 3) further treating the radioactive wastewater including the activating agent using an electro-deionization device; and 4) collecting two liquid flows obtained in 3), one being purified water, the other being concentrated water returning to 2) for further purification.

1 Claim, No Drawings

ACTIVATING AGENT FOR TREATMENT OF RADIOACTIVE WASTEWATER AND METHOD USING THE SAME FOR RADIOACTIVE WASTEWATER TREATMENT

CROSS-REFERENCE TO RELATED APPLICATIONS

This application is a continuation-in-part of International Patent Application No. PCT/CN2015/081900 with an international filing date of Jun. 19, 2015, designating the United States, and further claims priority benefits to Chinese Patent Application No. 201510271705.1 filed May 26, 2015. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The invention relates to an activating agent for the treatment of radioactive wastewater and method using the same for radioactive wastewater treatment.

Description of the Related Art

Conventional methods for treatment of radioactive wastewater include evaporation, ion exchange, reverse osmosis, and electro-deionization. The processes are complex, and water purified using the same still contains relatively high amounts of radioactive substances and does not meet discharge standards.

SUMMARY OF THE INVENTION

In view of the above-described problems, it is one objective of the invention to provide an activating agent for the treatment of radioactive wastewater and method using the same for radioactive wastewater treatment.

To achieve the above objective, in accordance with one embodiment of the invention, there is provided an activating agent for treating radioactive wastewater, the activating agent being prepared by dissolving a mixture of inorganic salts comprising $Ca^{2+}$, $Na^{+}$, $SP^{2+}$, $Zn^{2+}$, $Fe^{2+}$ and $K^{+}$ in pure water having an electrical resistivity greater than 0.5 MΩ·cm to yield a solution, wherein the concentrations of the inorganic salts in the solution are as follows:

$Ca^{2+}$: 0.01-1 g/L;
$Na^{+}$: 0.02-1.5 g/L;
$Sr^{2+}$: 0.8-45 mg/L;
$Zn^{2+}$: 1.8-100 mg/L;
$Mg^{2+}$: 0.02-1.25 g/L;
$Fe^{2+}$: 4-250 mg/L; and
$K^{+}$: 10-750 mg/L.

In use, the activing agent is added to radioactive wastewater and uniformly mixed, and the concentrations of the inorganic salts in the radioactive wastewater are controlled as follows:

$Ca^{2+}$: 0.1-0.2 mg/L;
$Na^{+}$: 0.2-0.3 mg/L;
$Sr^{2+}$: 8-9 μg/L;
$Zn^{2+}$: 18-20 μg/L;
$Mg^{2+}$: 0.2-0.25 mg/L;
$Fe^{2+}$: 0.04-0.05 mg/L; and
$K^{+}$: 100-150 μg/L.

In a class of this embodiment, a total concentration of the inorganic salts in the radioactive wastewater after uniformly mixing with the activating agent is greater than 0.1 mg/L and less than or equal to 10 mg/L.

In a class of this embodiment, the total concentration of the inorganic salts in the radioactive wastewater after uniformly mixing with the activating agent is greater than 0.6 mg/L and less than or equal to 1.0 mg/L.

The invention also provides a method of radioactive wastewater treatment using the activating agent, the method comprising:

1) preparing the activating agent by dissolving a mixture of inorganic salts comprising $Ca^{2+}$, $Na^{+}$, $Sr^{2+}$, $Zn^{2+}$, $Mg^{2+}$, $Fe^{2+}$ and $K^{+}$ in pure water having an electrical resistivity greater than 0.5 MΩ·cm to yield a solution, wherein the concentrations of the inorganic salts in the solution are as follows:

$Ca^{2+}$: 0.01-1 g/L;
$Na^{+}$: 0.02-1.5 g/L;
$Sr^{2+}$: 0.8-45 mg/L;
$Zn^{2+}$: 1.8-100 mg/L;
Me: 0.02-1.25 g/L;
$Fe^{2+}$: 4-250 mg/L; and
$K^{+}$: 10-750 mg/L;

2) adding the activating agent to radioactive wastewater having an electrical resistivity greater than 0.5 MΩ·cm, wherein a volume percentage of the activating agent to the radioactive wastewater is between 0.02% and 1%; uniformly mixing the activating agent and the radioactive wastewater until the concentrations of the inorganic salts in the radioactive wastewater are as follows:

$Ca^{2+}$: 0.1-0.2 mg/L;
$Na^{+}$: 0.2-0.3 mg/L;
$Sr^{2+}$: 8-9 μg/L;
$Zn^{2+}$: 18-20 μg/L;
$Mg^{2+}$: 0.2-0.25 mg/L;
$Fe^{2+}$: 0.04-0.05 mg/L; and
$K^{+}$: 100-150 μg/L;

3) further treating the radioactive wastewater comprising the activating agent using an electro-deionization device; and 4) collecting two liquid flows obtained in 3), one being purified water, the other being concentrated water returning to 2) for further purification.

Preferably, a total concentration of the inorganic salts in the radioactive wastewater after uniformly mixing with the activating agent is greater than 0.1 mg/L and less than or equal to 10 mg/L, more preferably, the total concentration of the inorganic salts in the radioactive wastewater after uniformly mixing with the activating agent is greater than 0.6 mg/L and less than or equal to 1.0 mg/L.

Advantages of the activating agent for treatment of radioactive wastewater according to embodiments of the invention are summarized as follows:

Conventionally, after treatment of two-stage reverse osmosis and electrodeionization, the total beta radioactivity of the radioactive wastewater is 1.22 Bq/L. In this invention, with the addition of the activating agent and further treatment of electrodeionization, the total beta radioactivity of the radioactive wastewater is $2.73\times10^{-2}$ Bq/L, which is lower than the total beta radioactivity of local tap water. In general, the total beta radioactivity of local tap water is the natural background radiation, specifically, $3.23\times10^{-2}$ Bq/L.

In summary, through the treatment of the activating agent and using the treatment method of the invention, the total beta radioactivity of the radioactive wastewater reaches the level of natural background radiation.

DETAILED DESCRIPTION OF THE EMBODIMENTS

For further illustrating the invention, experiments detailing an activating agent for the treatment of radioactive wastewater and method using the same for radioactive wastewater treatment are described below. It should be noted that the following examples are intended to describe and not to limit the invention.

Example 1

After treatment of two-stage reverse osmosis and electrodeionization, the total beta radioactivity of the radioactive wastewater was 1.22 Bq/L. To further reduce the radioactivity, an activating agent comprising pure water having an electrical resistivity greater than 0.5 MΩ·cm and inorganic salts comprising $Ca(NO_3)_2$, $NaNO_3$, $Sr(NO_3)_2$, $Zn(NO_3)_2$, $Mg(NO_3)_2$, $Fe(NO_3)_2$ and $KNO_3$ was prepared, and the concentration of cations in the activating agent were as follows:

$Ca^{2+}$: 0.1 g/L;
$Na^{+}$: 0.2 g/L;
$Sr^{2+}$: 8 mg/L;
$Zn^{2+}$: 18 mg/L;
$Mg^{2+}$: 200 mg/L;
$Fe^{2+}$: 40 mg/L;
$K^{+}$: 100 mg/L.

The prepared activating agent was added to radioactive wastewater with a volume ratio thereof of 1:1000 (the activating agent to the radioactive wastewater), uniformly mixed, then the wastewater was treated using an electrodeionization device. After the treatment, the total beta radioactivity of the radioactive wastewater is $2.73\times10^{-2}$ Bq/L, which is lower than the total beta radioactivity of local tap water. In general, the total beta radioactivity of local tap water is the natural background radiation, specifically, $3.23\times10^{-2}$ Bq/L.

Example 2

After treatment of two-stage reverse osmosis and electrodeionization, the total beta radioactivity of the radioactive wastewater was 1.97 Bq/L. To further reduce the radioactivity, an activating agent comprising pure water having an electrical resistivity greater than 0.5 MΩ·cm and inorganic salts comprising $Ca(NO_3)_2$, NaCl, $Sr(NO_3)_2$, $ZnCl_2$, $Mg(NO_3)_2$, $Fe(NO_3)_2$ and KCl was prepared, and the concentration of cations in the activating agent were as follows:

$Ca^{2+}$: 0.1 g/L;
$Na^{+}$: 1.5 g/L;
$Sr^{2+}$: 45 mg/L;
$Zn^{2+}$: 100 mg/L;
$Mg^{2+}$: 1.2 g/L;
$Fe^{2+}$: 250 mg/L;
$K^{+}$: 750 mg/L.

The prepared activating agent was added to radioactive wastewater with a volume ratio thereof of 1:1200 (the activating agent to the radioactive wastewater), uniformly mixed, then the wastewater was treated using an electrodeionization device. After the treatment, the total beta radioactivity of the radioactive wastewater is $4.56\times10^{-2}$ Bq/L, which is lower than the total beta radioactivity of local tap water. In general, the total beta radioactivity of local tap water is the natural background radiation, specifically, $7.28\times10^{-2}$ Bq/L.

In contrast, according to conventional process, the radioactive wastewater was evaporated and ion exchange was followed, and the total beta radioactivity of the treated radioactive wastewater is 3.28 Bq/L, which is much higher than that of the invention.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An activating agent for treating wastewater comprising radioactive substances, the activating agent being prepared by dissolving inorganic salts comprising $Ca^{2+}$, $Na^{+}$, $Sr^{2+}$, $Zn^{2+}$, $Mg^{2+}$, $Fe^{2+}$, and $K^{+}$ in pure water having an electrical resistivity greater than 0.5 MΩ·cm, wherein the concentrations of the $Ca^{2+}$, $Na^{+}$, $Sr^{2+}$, $Zn^{2+}$, $Mg^{2+}$, $Fe^{2+}$, and $K^{+}$ in the activating agent are as follows:

$Ca^{2+}$: 0.01-1 g/L;
$Na^{+}$: 0.02-1.5 g/L;
$Sr^{2+}$: 0.8-45 mg/L;
$Zn^{2+}$: 1.8-100 mg/L;
$Mg^{2+}$: 0.02-1.25 g/L;
$Fe^{2+}$: 4-250 mg/L; and
$K^{+}$: 10-750 mg/L.

* * * * *